United States Patent [19]
Carey

[11] Patent Number: 4,516,427
[45] Date of Patent: May 14, 1985

[54] QUARTZ RATE SENSOR

[75] Inventor: Desmond F. Carey, Oradell, N.J.

[73] Assignee: Allied Corporation, Morris Township, Morris County, N.J.

[21] Appl. No.: 498,349

[22] Filed: May 26, 1983

[51] Int. Cl.$^3$ .................. G01D 3/44; G01C 21/00
[52] U.S. Cl. .................................................. 73/505
[58] Field of Search ............... 73/504, 505; 356/350

[56] References Cited

U.S. PATENT DOCUMENTS

| | | | |
|---|---|---|---|
| 3,218,871 | 11/1965 | Dressler et al. | 73/505 |
| 3,905,235 | 9/1975 | Shaw | 73/505 |
| 4,061,040 | 12/1977 | Shaw | 73/505 |

Primary Examiner—James J. Gill
Attorney, Agent, or Firm—S. N. Protigal; A. F. Cuoco; H. G. Massung

[57] ABSTRACT

A rate measuring instrument uses acoustic energy transmitted through a crystalline media (41) to sense rate. Acoustic energy travels along a path (1-31) within the crystalline media and impinges upon an output transducer (45) at an established point after being reflected a number of times from facets (47) of the crystalline media (41). Rate information is detected as a shift in the point of impingement of the greatest amount of acoustic energy upon the output transducer (45).

20 Claims, 1 Drawing Figure

U.S. Patent     May 14, 1985     4,516,427
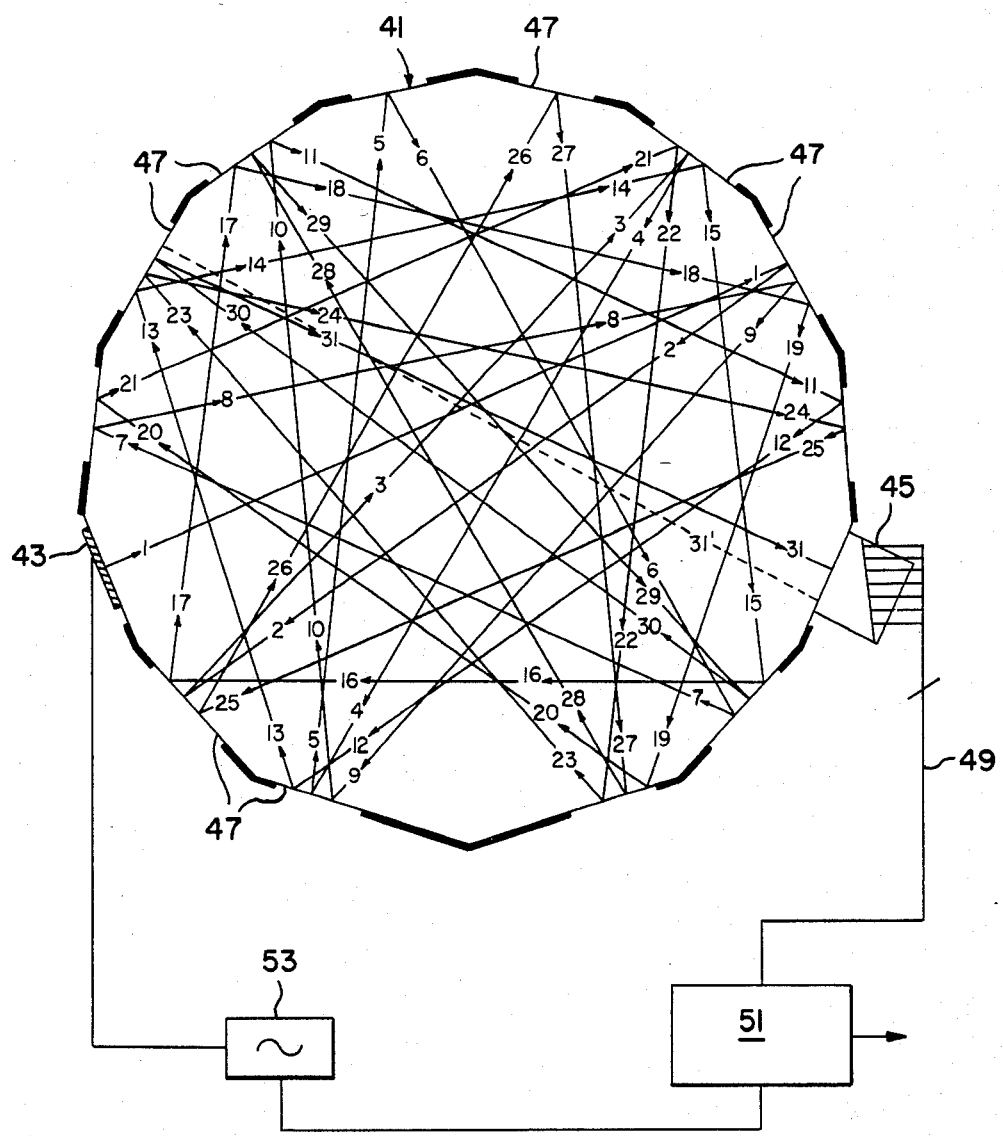

QUARTZ RATE SENSOR

BACKGROUND OF THE INVENTION

This invention relates to rotational motion detectors and more specifically to a motion detector using a crystalline substance and acoustic wave energy in order to detect rate.

Conventional rate sensors include gyroscopes, ring lasers and nuclear magnetic resonance (NMR) devices. While each prior art device provides the same information, the different principles at which they operate result in different drawbacks, including cost, energy consumption, weight, and sensitivity. This results in each prior art device having different advantages and disadvantages, so that the selection of a particular rate sensor is dependent upon the particular application. For example, presently, most inexpensive rate sensors are mechanical gyroscopes, which use the gyroscopic forces of a rotating mass in order to provide an output of force required to turn the rotating mass about a gimbal having an axis generally perpendicular to the mass in the manner well known to those skilled in the art. Rate sensor information is used for a wide variety of applications in addition to mere detection of change in attitude of a vehicle. For example, a rate sensor may be used for sensing the direction of true north by sensing the spin axis of the earth's rotation.

Acoustic wave energy has been used in one prior art acoustic rate sensor design. In this prior art sensor, a transducer generating acoustic waves is physically separated from a rotating surface wave carrier. A drive means such as a motor, must rotate the surface wave carrier in order that rate can be measured by sensing interference patterns.

It is desirable to construct a rate instrument in such a way that relative movement of parts is not necessary. This has the advantage of eliminating costly drive and bearing components, as well as enhancing the accuracy and greatly extending the lifetime of the instrument. For this reason, it is desired to provide a low cost rate instrument in which relative movement of component parts is either not required or only required to a minimum extent. It is further desired that a no-moving part rate instrument be constructed in which sensing of rate is accomplished efficiently, and in a low cost manner. It is a further object of the invention to use acoustic wave sensing in a rate instrument which does not require moving parts.

SUMMARY OF THE INVENTION

In accordance with the present invention, an acoustic wave rate sensor is constructed from a piezoelectric crystal, such as the quartz crystal, having an input and an output transducer thereon. Acoustic energy is transmitted through the crystal from the input transducer and a main beam of the energy is reflected from various facets of the crystal until the beam center reaches an output transducer. The output transducer detects a shift in the position of the beam center, and transmits this shift as rate information.

The output transducer can take any form that measures a shift in the position of the beam center, including an arrangement in which a beam shift results in an increased or decreased delay in receiving the signal. By connecting the output transducer and the input transducer to a comparator, the comparator can be used to control the timing of the input signal. The comparator's output then provides an indication of position of peak output or of a time delay, representing a shift in the beam direction, and can be used to trigger the oscillator.

BRIEF DESCRIPTION OF THE DRAWING

The drawing FIGURE shows a preferred embodiment of the invention, in which a comparator circuit is used for effecting rate measurements.

DETAILED DESCRIPTION OF THE PREFERRED EMBODIMENT

Referring to the FIGURE, a quartz crystal 41 is used as a media for transmitting acousitic energy from an input transducer 43 to an output transducer 45. Acoustic energy from the input transducer 43 is reflected from external facets 47 of the crystal 41, so that the energy is reflected along thirty one beam paths 1-31 until the energy from beam path 31 is received by the output transducer 45. The beam paths 1-31, represent the center of an acoustic wave energy beam, and consequently the paths of peak energy levels. In the preferred embodiment, the acoustic energy is reflected in a single direction around the crystal 41, shown in the drawing as clockwise.

As can be seen, the exact location of the paths 1-31 that the beam of acoustic energy has an effect on the location of path 31 as the beam approaches the output transducer. Therefore, if path 1 were to be slightly shifted, this would cause path 2 to also slightly shift, and so on. Since the direction of the reflections of paths 1-31 are in the same (clockwise) direction, the shift is exaggerated at each reflection because of the consequential shift of the point of reflection, and therefore of the angle of reflection. Thus, a very slight shift at the reflection of path 1 to path 2 would result in a significant shift in the position of path 31 as the beam approaches the output transducer 45, as shown by dashed line 31'. If the beam continues to shift throughout its movement along paths 1-31, the effect is increased.

The output transducer 45 is designed to sense changes in the position of a beam path 31 as the beam impinges on the transducer 45. The beam is received as a signal by the output transducer 45, which, in turn, transmits positional information, indicating relative signal strength at various points along the output transducer 45. This information is transmitted via a plurality of output lines 49 to a comparator network 51, where the signal indicating the peak energy level is selected. The signal level represents the position of the beam as path 31 impinges upon the output transducer 45. In the preferred embodiment, the determination of the strongest signal is effected by comparing adjacent signals in order to provide the maximum signal indication.

The comparator network 51 also is used to control the oscillator 53. After an initial oscillation, oscillation is initiated by the occurrence of a signal from the output transducer 45. This causes a signal generated by the input transducer 43 to occur only after the receipt of the signal from output transducer 45, thus minimizing the possibilities of acoustic wave interference within the crystal 41.

In operation, the rotation of the crystal 41 results in a shift in a path 31 of the acoustic energy beam as it empinges upon the output transducer 45. This shift, detected at the output transducer 45 and its associated processing circuitry 51 is transmitted as an indication of rate information. Clearly, the specific methods of detecting this shift in rate can be altered. For example, it is possible to provide further increases in range by permitting the point of transmission at the input transducer 43 to be shifted, thereby, compensating for a shift in the paths 1-31 which would otherwise cause the termination of path 31 to exceed the physical dimensions of the output transducer 45. It is also possible to arrange the output transducer size to receive the acoustic energy at an angle, thereby sensing the energy at different positions as being shifted in phase. This phase shift information would then be compared to a standard signal, such as a signal from the oscillator 53, triggering the next pulse.

It is therefore clear that various changes to the preferred embodiment can be made without departing from the scope of the invention. Therefore, the invention should be read as limited only by the claims.

What is claimed is:

1. Sensor for information concerning movement in inertial space characterized by:
   (a) a crystalline substance having a plurality of facets;
   (b) means, rotationally fixed to said crystalline substance, for transmitting acoustic energy through the crystalline substance such that a substantial amount of the energy occurs along a main beam and the energy in the beam is reflected from the facets until the energy occurs at an output position; and
   (c) means, rotationally fixed to said crystalline substance, for detecting a shift in the output position resulting from a deflection of the beam.

2. Apparatus as described in claim 1, further characterized by:
   the crystalline substance being piezoelectric.

3. Apparatus as described in claim 2, further characterized by:
   the crystalline substance being quartz.

4. Apparatus as described in claim 1, further characterized by:
   the transmitting means and the receiving means being fixed to the crystalline substance.

5. Apparatus as described in claim 1, further characterized by:
   the deflection of the beam providing a rate measurement.

6. Apparatus as described in claim 5, further characterized by:
   the beam traveling in the same rotational direction around the crystalline substance each time it is reflected from one of the facets.

7. Apparatus as described in claim 1, further characterized by:
   the beam shift detection means being an output transducer having a plurality of output locations and the deflection of the beam causing a peak amount of energy to be indicated as sensed at different ones of said plurality of output locations.

8. Apparatus as described in claim 1, further characterized by:
   means to interrupt the transmission of acoustic energy for a given time until the position of the beam is determined.

9. Apparatus for sensing rotational motion, characterized by:
   (a) a piezoelectric crystalline substance having a plurality of facets thereon;
   (b) means, fixed to said crystalline substance, for transmitting acoustic energy such that a main beam of the acoustic energy is reflected from the facets in a single rotational direction about the crystalline substance;
   (c) means, fixed to said crystalline substance, for detecting the position of the beam after a predetermined number of said reflections.

10. Apparatus as described in claim 9, further characterized by:
    the crystalline substance being piezoelectric.

11. Apparatus as described in claim 10, further characterized by:
    the crystalline substance being quartz.

12. Apparatus as described in claim 9, further characterized by:
    the transmitting means and the receiving means being fixed to the crystalline substance.

13. Apparatus as described in claim 9, further characterized by:
    the deflection of the beam providing a rate measurement.

14. Apparatus as described in claim 13, further characterized by:
    the beam traveling in the same rotational direction around the crystalline substance each time it is reflected from one of the facets.

15. Apparatus as described in claim 9, further characterized by:
    the beam detection means being an output transducer having a plurality of output locations and deflection of the beam causing a peak amount of energy to be indicated as sensed at different ones of said plurality of output locations.

16. Apparatus as described in claim 9, further characterized by:
    means to interrupt the transmission of acoustic energy for a given time until the position of the beam is determined.

17. Method of sensing information concerning movement in inertial space with acoustic energy passing through a crystalline substance having a plurality of facets characterized by:
    (a) transmitting acoustic energy through the crystalline substance such that a substantial amount of the energy occurs along a main beam and the energy in the beam is reflected from the facets until the energy occurs at an output position;
    (b) receiving a reflection of said acoustic energy from an output position, said output position being located in said crystalline substance; and
    (c) detecting a shift in the output position resulting from a deflection of the beam.

18. Method as described in claim 17, further characterized by:
    the crystalline substance being quartz.

19. Method as described in claim 17, further characterized by:
    transmitting and receiving the acoustic energy from transducers which are fixed to the crystalline substance.

20. Method as described in claim 17, further characterized by:
    (a) the deflection of the beam providing a rate measurement; and
    (b) causing the beam to travel in the same rotational direction around the crystalline substance each time it is reflected from one of the facets.

* * * * *